United States Patent
Kameyama et al.

(10) Patent No.: US 7,565,073 B2
(45) Date of Patent: Jul. 21, 2009

(54) PHOTOGRAPHY APPARATUS, PHOTOGRAPHY METHOD, AND PHOTOGRAPHY PROGRAM FOR OBTAINING AN IMAGE OF A SUBJECT

(75) Inventors: Hirokazu Kameyama, Kanagawa-ken (JP); Wataru Ito, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 298 days.

(21) Appl. No.: 11/434,171

(22) Filed: May 16, 2006

(65) Prior Publication Data

US 2006/0268150 A1 Nov. 30, 2006

(30) Foreign Application Priority Data

May 16, 2005 (JP) .............................. 2005-142689

(51) Int. Cl.
*G03B 13/34* (2006.01)
*H04N 5/262* (2006.01)
*H04N 5/235* (2006.01)

(52) U.S. Cl. .................. 396/123; 348/239; 348/362

(58) Field of Classification Search .................. 396/123, 396/234; 382/118, 243; 348/229.1, 333.03, 348/349, 222.1, 239, 362, 364, 365
See application file for complete search history.

(56) References Cited

U.S. PATENT DOCUMENTS

| 5,305,048 | A  | * | 4/1994  | Suzuki et al. .............. 396/159 |
| 6,151,073 | A  | * | 11/2000 | Steinberg et al. ............ 348/371 |
| 6,940,545 | B1 | * | 9/2005  | Ray et al. ................. 348/222.1 |
| 7,315,630 | B2 | * | 1/2008  | Steinberg et al. ............ 382/118 |
| 7,362,368 | B2 | * | 4/2008  | Steinberg et al. ............ 348/349 |
| 2007/0126921 | A1 | * | 6/2007 | Gallagher et al. ........... 348/362 |
| 2007/0206939 | A1 | * | 9/2007 | Ito et al. .................... 396/123 |
| 2008/0043122 | A1 | * | 2/2008 | Steinberg et al. ............ 348/239 |

FOREIGN PATENT DOCUMENTS

JP 2000-188768 A 7/2000

OTHER PUBLICATIONS

T.F. Cootes et al., "Active Appearance Models", Proc. European Conference on Computer Vision, vol. 2, pp. 484-498, Springer, 1998.

* cited by examiner

*Primary Examiner*—Jay M Patidar
(74) *Attorney, Agent, or Firm*—Sughrue Mion, PLLC

(57) ABSTRACT

An exposure value is determined based on a face region, with high accuracy and with less effect of a background region or density contrast caused by shadow. For this purpose, a face detection unit detects a face region from a face candidate region in a through image detected by a face candidate detection unit, by fitting to the face candidate region a mathematical model generated by a method of AAM using a plurality of sample images representing human faces. An exposure value determination unit then determines an exposure value for photography, based on the face region.

12 Claims, 6 Drawing Sheets

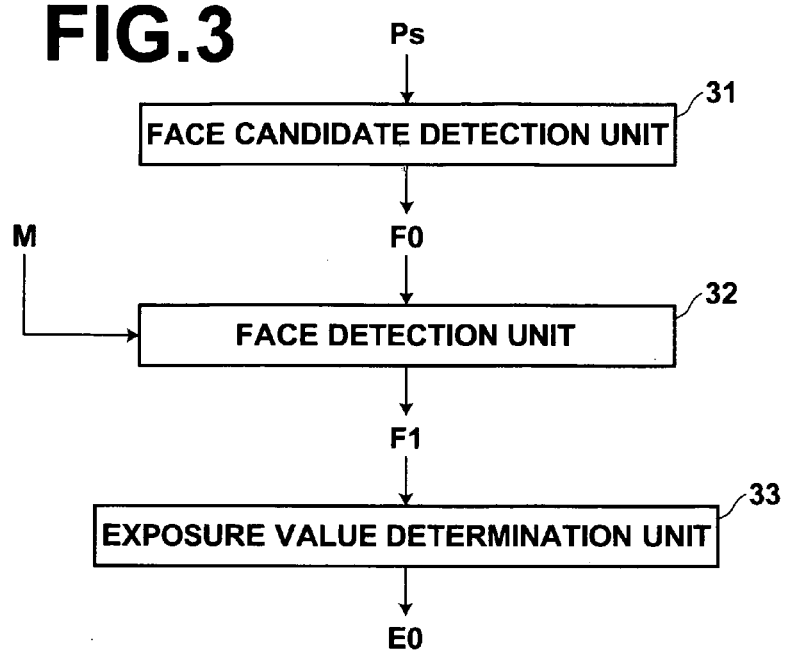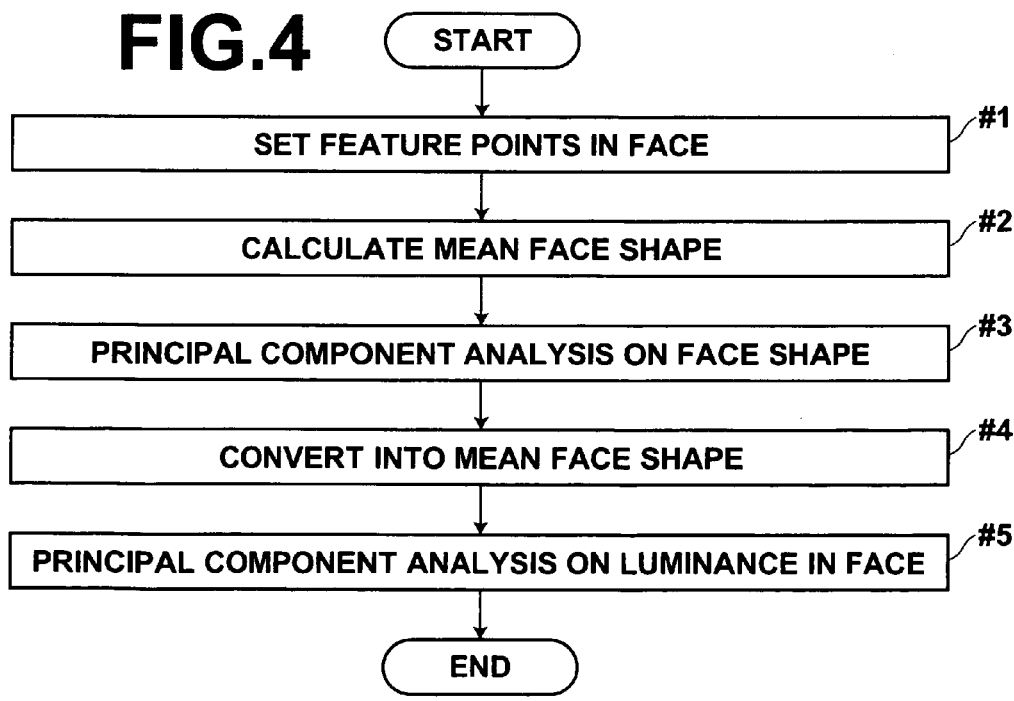

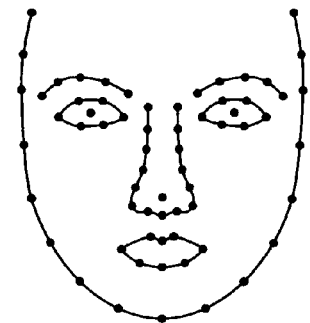
FIG.5
FIG.6
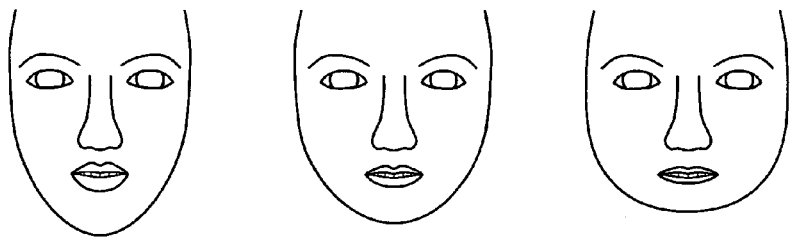
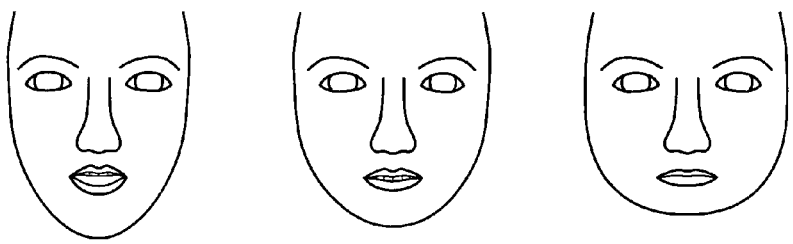

PHOTOGRAPHY APPARATUS, PHOTOGRAPHY METHOD, AND PHOTOGRAPHY PROGRAM FOR OBTAINING AN IMAGE OF A SUBJECT

BACKGROUND OF THE INVENTION

1. Field of the Invention

The present invention relates to a photography apparatus, a photography method, and a photography program for obtaining an image of a subject by photography thereof.

2. Description of the Related Art

In order to reproduce a human face included in a photograph image in an ideal color, image processing has been carried out for correcting contrast of a face by extracting the face from an image.

For example, a method has been proposed in Japanese Unexamined Patent Publication No. 2000-188768 for correcting gradation. In this method, pixel values of an image are converted into pixel values in a YUV color space, and a skin-color region is detected in the image by assuming that pixels having values included in a skin-color space representing a predetermined skin-color in the YUV color space are skin-color pixels. A face region is then determined by using a characteristic quantity such as a mean luminance value of the skin-color region, and a state of exposure is judged based on skin-color information in the face region. In this manner, gradation is corrected.

Meanwhile, a digital camera obtains an image of desired quality by carrying out therein image processing such as gradation processing, color correction processing, density correction processing, and AWB on an image photographed by the camera. At the time of photography, AE processing is also carried out for carrying out photography in appropriate exposure. In the case where AE processing is carried out, an input through image, which is obtained before a shutter button is pressed, is divided into a plurality of regions, for example. Weighted mean luminance of the regions is then used as luminance of a subject. Alternatively, luminance of a subject is measured by intensively carrying out photometry in a center region of an image or by assuming that luminance at the point of focus is luminance of the subject. Based on a result of the measurement, an exposure value is determined for carrying out photography according to the exposure value.

If the method of face region detection described in Japanese Unexamined Patent Publication No. 2000-188768 is applied to AE processing by a digital camera, a farce region is detected in an input through image obtained before pressing of a shutter button, and an exposure value is determined based on the detected face region. Photography is then carried out according to the exposure value having been obtained. In this manner, exposure can be controlled appropriately according to a face region to be included in an image to be photographed.

However, the face region detection method described in Japanese Unexamined Patent Publication No. 2000-188768 cannot detect a skin-color region with accuracy in the case where a shadow is cast on a skin-color region or in the case where a boundary between a skin-color region and a background region thereof cannot be detected due to a color of the background region being close to a skin color, for example. In the former case, only a part without the shadow is detected as the skin-color region, and gradation is corrected based on a part with no shadow. As a result, contrast of an image having been subjected to the correction tends to be too sharp. Consequently, application of the method described in Japanese Unexamined Patent Publication No. 2000-188768 to a digital camera does not appropriately determine an exposure value.

SUMMARY OF THE INVENTION

The present invention has been conceived based on consideration of the above circumstances. An object of the present invention is therefore to enable determination of an exposure value based on a skin-color region with higher accuracy.

A photography apparatus of the present invention comprises:

face detection means for detecting a face region in an input through image by fitting a model representing a human face to a face candidate region in the input through image, the model obtained by carrying out predetermined statistical processing on a plurality of images representing human faces, and the model representing the human face by one or more statistical characteristic quantities including a statistical characteristic quantity representing at least a face outline shape;

exposure value determination means for determining an exposure value for photography of a still image, based on the detected face region; and photography means for carrying out the photography of the still image according to the exposure value having been determined.

A photography method of the present invention comprises the steps of:

detecting a face region in an input through image by fitting a model representing a human face to a face candidate region in the input through image, the model obtained by carrying out predetermined statistical processing on a plurality of images representing human faces, and the model representing the human face by one or more statistical characteristic quantities including a statistical characteristic quantity representing at least a face outline shape;

determining an exposure value for photography of a still image, based on the detected face region; and carrying out the photography of the still image according to the exposure value having been determined.

A photography program of the present invention is a program for causing a computer to execute the photography method described above (that is, a program for causing a computer to function as the means described above).

As a method of generating the model representing human faces in the present invention, a method of AAM (Active Appearance Model) can be used. An AAM is one of approaches in interpretation of the content of an image by using a model. For example, in the case where a human face is a target of interpretation, a mathematical model of human face is generated by carrying out principal component analysis on face shapes in a plurality of images to be learned and on information of luminance after normalization of the shapes. A face in a new input image is then represented by principal components in the mathematical model and corresponding weighting parameters, for face image reconstruction (T. F. Cootes et al., "Active Appearance Models", Proc. European Conference on Computer Vision, vol. 2, Springer, 1998; hereinafter referred to as Reference 1).

The plurality of images may be images obtained by actually photographing human faces. Alternatively, the images may be generated through simulation.

It is preferable for the predetermined statistical processing to be dimension reduction processing that can represent the face region by the statistical characteristic quantity or quantities of fewer dimensions than the number of pixels representing the face region. More specifically, the predetermined statistical processing may be multivariate analysis such as principal component analysis. In the case where principal component analysis is carried out as the predetermined statistical processing, the statistical characteristic quantity or quantities refers/refer to a principal component/principal components obtained through the principal component analysis.

The statistical characteristic quantity or quantities need(s) to represent information on at least the face outline shape, in order to detect the face region with high accuracy.

The statistical characteristic quantity representing the face outline shape may be a single statistical characteristic quantity or a plurality of statistical characteristic quantities.

The input through image refers to an image imaged by imaging means before an instruction to photograph the still image is input. More specifically, in the case where an image is displayed in the form of a moving image on a monitor of a digital camera before a shutter button is fully pressed, each frame comprising the moving image is the input through image.

The face candidate region in the input trough image may be detected automatically or manually. A step (or means) may be added to the present invention for detecting the face candidate region in the input through image. Alternatively, the face candidate region may have been detected in the input through image.

Determining the exposure value for photography of the still image according to the face region refers to determining the exposure value for obtaining the image with the face region in appropriate luminance. More specifically, luminance of the face region is measured by intensive photometry of the face region or by photometry on the face region only, for example. Based on a result of the measurement, the exposure value is determined.

In the present invention, a plurality of models maybe prepared for respective properties of human face. In this case, the steps (or means) may be added to the present invention for obtaining properties of the face candidate region in the input through image and for selecting models according to the properties having been obtained. The face region can be detected by fitting the selected model to the face candidate region in the input through image.

The properties refer to gender, age, and race. The property maybe information for identifying an individual. In this case, the models for the respective properties refer to models for respective individuals.

As a specific method of obtaining the property may be listed image recognition processing having been known (such as image recognition processing described in Japanese Unexamined Patent Publication No. 11(1999)-175724). Alternatively, the property may be inferred or obtained based on information such as GPS information accompanying the image.

Fitting the model representing human face to the face candidate region in the input through image refers to calculation for representing the face candidate region in the input through image by the model. More specifically, in the case where the method of AAM described above is used, fitting the model refers to finding values of the weighting parameters for the respective principal components in the mathematical model.

The photography apparatus, the photography method, and the photography program of the present invention pay attention to the statistical characteristic quantity representing face outline shape. According to the present invention, the face region in the input through image is detected by fitting to the face candidate region in the input through image the model representing human face by the statistical characteristic quantity or quantities including the statistical characteristic quantity representing face outline shape. The exposure value is determined according to the detected face region for photography of the still image, and the still image is then photographed according to the exposure value having been determined.

For this reason, even in the case where a shadow is cast on the face region or a color of a background region is close to a skin color, the face region can be detected accurately in the input through image. Therefore, the exposure value can be determined, highly accurately reflecting luminance of the face region in the input through image with less effect of a background region excluding the face region. Consequently, the still image can be photographed in high color reproducibility.

In the case where the step (or the means) is added for detecting the face candidate region in the input through image, automatic detection of the face candidate region can be carried out. Therefore, the photography apparatus becomes easier to operate.

In the case where the plurality of models are prepared for respective properties of human face in the present invention while the steps (or the means) are added for obtaining the property of the face candidate region in the input through image and for selecting one of the models in accordance with the property having been obtained, if the face region is detected by fitting the selected model to the face candidate region in the input through image, the face region in the input through image can be fit to the model that is more suitable. Therefore, processing accuracy is improved, and a higher quality image can be obtained.

Note that the program of the present invention may be provided being recorded on a computer readable medium. Those who are skilled in the art would know that computer readable media are not limited to any specific type of device, and include, but are not limited to: floppy disks; RAMs; ROMs; CDs; magnetic tapes; and hard disks, on which computer instructions may be stored. Transmission of the computer instructions through a network is also within the scope of the present invention. In addition, the computer instructions may be in the form of object, source, or executable code, and may be written in any language, including higher level languages, assembly language, and machine language.

BRIEF DESCRIPTION OF THE DRAWINGS

FIG. 3 is a block diagram showing details of exposure value determination processing in one aspect of the present invention;

FIG. 4 is a flow chart showing a procedure for generating a mathematical model of face image in the present invention;

FIG. 5 shows an example of how feature points are set in a face;

FIG. 6 shows how a face shape changes with change in values of weight coefficients for eigenvectors of principal components obtained through principal component analysis on the face shape;

DESCRIPTION OF THE PREFERRED EMBODIMENT

Hereinafter, an embodiment of the present invention will be described with reference to the accompanying drawings.

Figure 1:
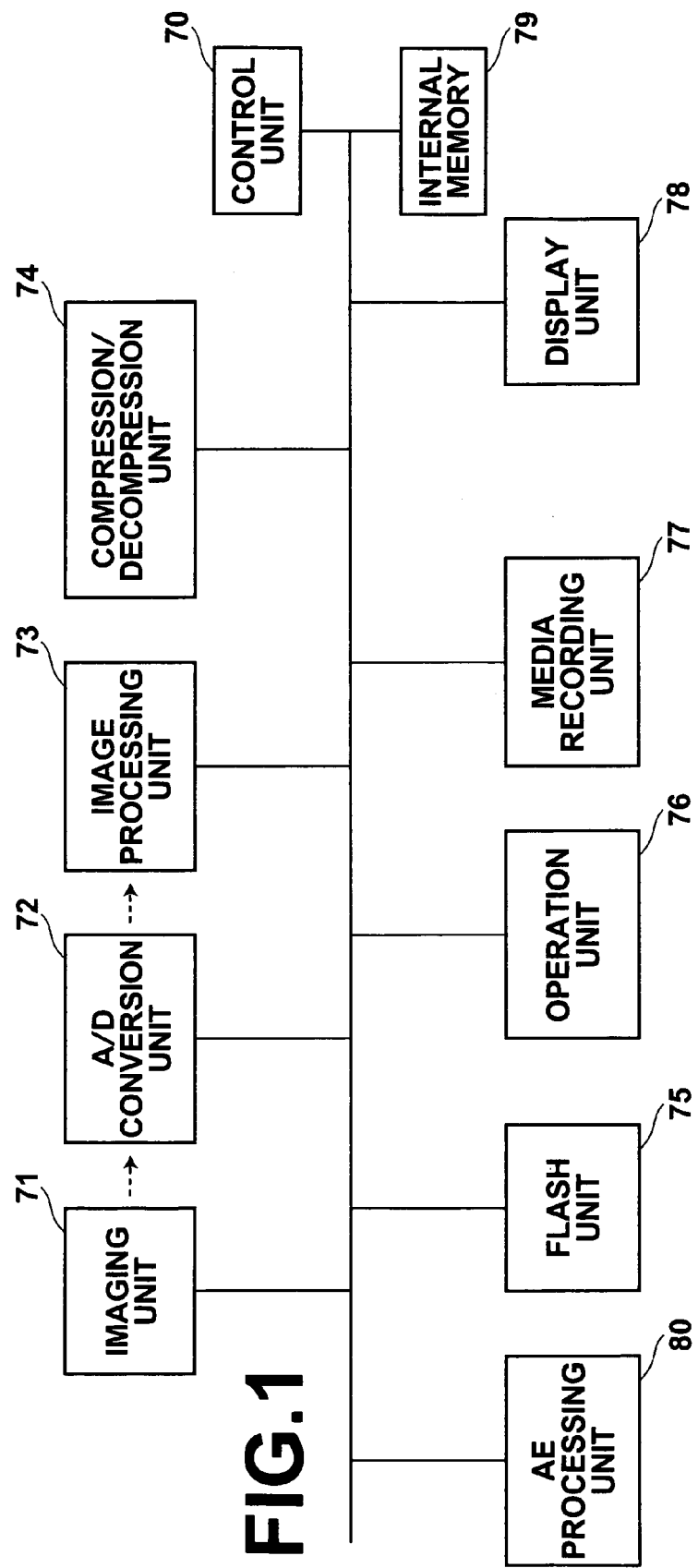
FIG. 1 shows the configuration of a digital camera in an embodiment of the present invention.

FIG. 1 shows the configuration of a digital camera as an embodiment of the present invention. As shown in FIG. 1, the digital camera has an imaging unit 71, an A/D conversion unit 72, an image processing unit 73, a compression/decompression unit 74, a flash unit 75, an operation unit 76, a media recording unit 77, a display unit 78, a control unit 70, an internal memory 79, and an AE processing unit 80. The imaging unit 71 comprises a lens, an iris, a shutter, a CCD, and the like, and photographs a subject. The A/D conversion unit 72 obtains digital image data by digitizing an analog signal represented by charges stored in the CCD of the imaging unit 71. The image processing unit 73 carries out various kinds of image processing on image data. The compression/decompression unit 74 carries out compression processing on image data to be stored in a memory card, and carries out decompression processing on image data read from a memory card in a compressed form. The flash unit 75 comprises a flash and the like, and carries out flash emission. The operation unit 76 comprises various kinds of operation buttons, and is used for setting a photography condition, an image processing condition, and the like. The media recording unit 77 is used as an interface with a memory card in which image data are stored. The display unit 78 comprises a liquid crystal display (hereinafter referred to as the LCD) and the like, and is used for displaying a through image, a photographed image, various setting menus, and the like. The control unit 70 controls processing carried out by each of the units. The internal memory 79 stores a control program, image data, and the like. The AE processing unit 80 carries out AE processing.

In cooperation with each of the units of the digital camera, the control unit 70 controls a processing flow regarding an image, such as photography, input, correction, manipulation, and output thereof, by executing the control program stored in the internal memory 79. The control unit 70 also carries out image processing calculation for image correction and manipulation. Exposure value determination processing of the present invention is carried out by the AE processing unit 80, according to control by the control unit 70.

Operation of the digital camera and the flow of processing therein will be described next.

When a photographer switches on the digital camera, the imaging unit 71 causes light entering the lens from a subject to form an image on a photoelectric surface of the CCD, and outputs an analog image signal after photoelectric conversion. The A/D conversion unit 72 converts the analog image signal output from the imaging unit 71 to a digital image signal, and displays the digital image signal as digital through image data Ps on the display unit 78. The digital through image data Ps are generated by serially imaging the subject at a predetermined frame rate while appropriately thinning signals output from all devices comprising the CCD. By serial display of the image represented by the digital through image data Ps (hereinafter image data and an image represented by the image data are represented by the same reference number) on the display unit 78, the subject is shown in the form of a moving image.

The AE processing unit 80 then carries out the processing for determining an exposure value for photography. For realizing this processing, the control unit 70 starts a control program for exposure value determination stored in the internal memory 79, and causes the AE processing unit 80 to carry out the exposure value determination processing (which will be described later) using a mathematical model M stored in the internal memory 79.

Thereafter, the photographer fully presses a shutter button, and the imaging unit 71 obtains the image by using the exposure value having been determined. More specifically, the imaging unit 71 causes the light entering the lens from the subject to form the image on the photoelectric surface of the CCD. After photoelectric conversion, the imaging unit 71 outputs an analog image signal, and the A/D conversion unit 72 converts the analog image signal output from the imaging unit 71 to a digital image signal. The A/D conversion unit 72 then outputs the digital image signal as digital image data P0.

In the image processing unit 73, publicly known image processing such as gradation correction processing, color correction processing, density correction processing, white balance adjustment processing, sharpness correction, and noise reduction and removal is carried out based on the condition set on the digital camera, according to an image processing program executed by the control unit 70. Processed image data P1 are then output.

Figure 2A:
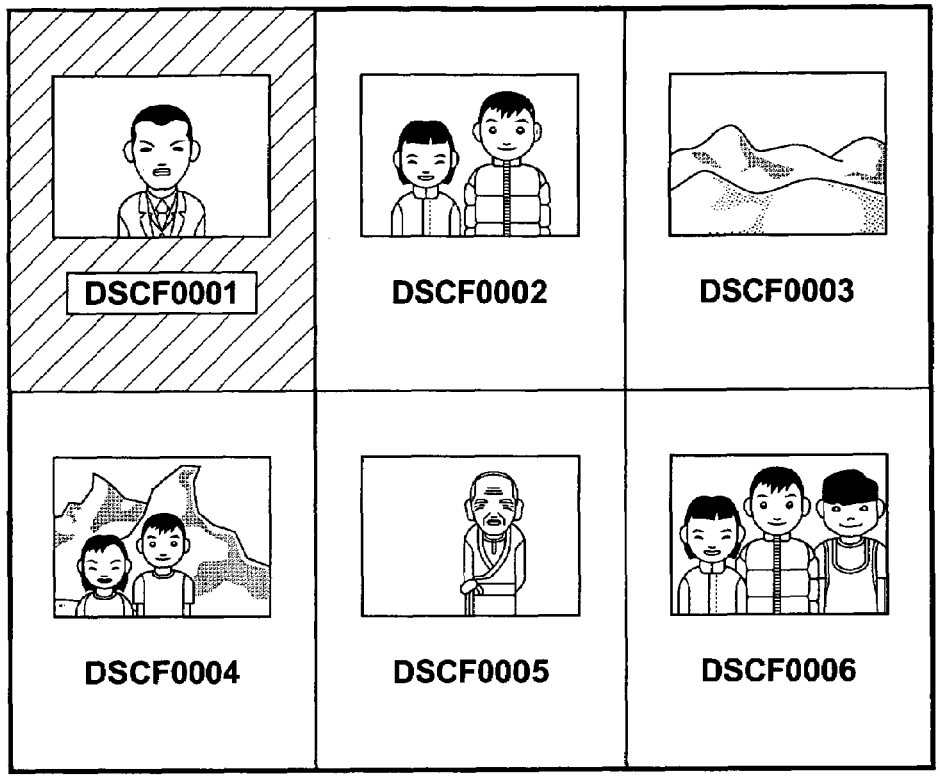
FIGS. 2A and 2B show examples of screens displayed on a display unit of the digital camera in the embodiment.
Figure 2B:
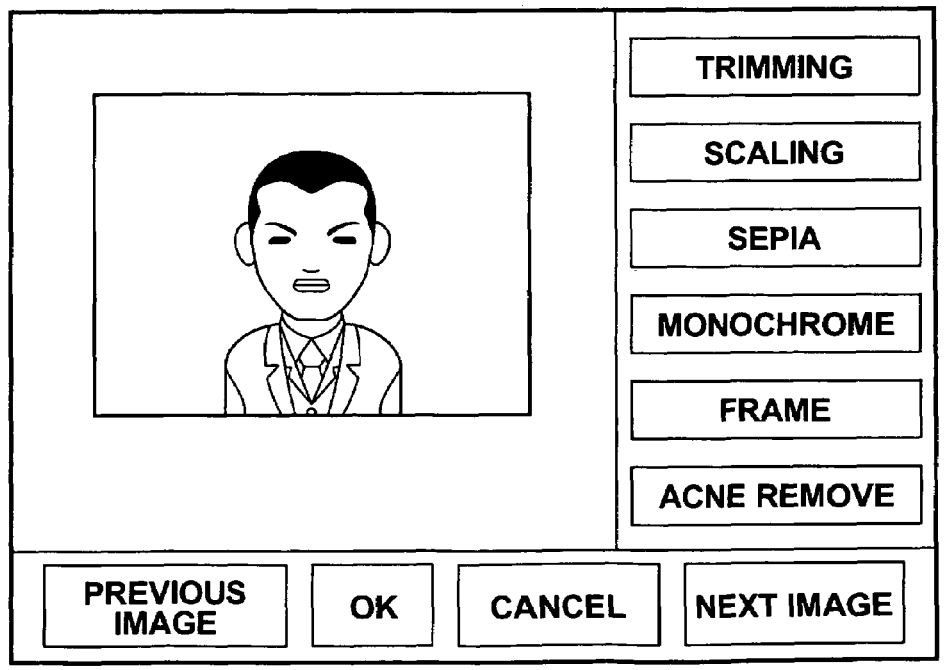

The image P1 is displayed on the LCD of the display unit 78. FIG. 2A shows an example of a screen shown on the LCD. The photographer confirms displayed thumbnail images, and selects any one of the thumbnail images that needs manual image-quality correction while using the operation buttons of the operation unit 76. In FIG. 2A, the image in the upper left corner (DSCF0001) is selected. As shown in FIG. 2B as an example, the selected thumbnail image is enlarged and displayed on the display unit 78, and buttons are also displayed for selecting the content of manual correction and manipulation on the image. The photographer selects a desired one of the buttons by using the operation unit 76, and carries out detailed setting of the selected content if necessary. The image processing unit 73 carries out the image processing according to the selected content, and outputs processed image data P2.

The control program executed by the control unit 70 controls the image display on the display unit 78, the reception of input from the operation unit 76, and the image processing such as manual correction and manipulation.

The compression/decompression unit 74 carries out compression processing on the image data P2 according to a compression format such as JPEG, and the compressed image data are stored via the media recording unit 77 in a memory card inserted in the digital camera.

The manual correction and manipulation may be carried out on the image having been stored in the memory card. More specifically, the compression/decompression unit 74 decompresses the image data stored in the memory card, and the image after the decompression is displayed on the LCD of the display unit 78. The photographer selects desired image processing as has been described above, and the image processing unit 73 carries out the selected image processing.

The exposure value determination processing carried out by the AE processing unit 80 in the present invention will be described below in detail. FIG. 3 is a block diagram showing details of the exposure value determination processing. The exposure value determination processing is carried out by a face candidate detection unit 31, a face detection unit 32, and an exposure value determination unit 33, as shown in FIG. 3. The face candidate detection unit 31 detects a face candidate region F0 in the through image Ps. The face detection unit 32 detects a face region F1 in the through image Ps by fitting to the face candidate region F0 the mathematical model M generated by a method of AAM (see Reference 1 described above) based on sample images representing human faces. The exposure value determination unit 33 determines an exposure value E0 based on the detected face region F1. The processing described above is carried out according to the control program stored in the internal memory 79.

The mathematical model M is generated according to a flow chart shown in FIG. 4, and stored in advance in the internal memory 79 together with the programs described above. Hereinafter, how the mathematical model M is generated will be described.

For each of the sample images representing human faces, feature points are set as shown in FIG. 5 for representing face shape (Step #1). The face shape includes a face outline shape in addition to shapes representing facial features such as eyes, mouth and nose. In this case, the number of the feature points is 122. However, only 60 points are shown in FIG. 5 for simplification. Which part of face is represented by which of the feature points is predetermined, such as the left corner of the left eye represented by the first feature point and the center between the eyebrows represented by the $38^{th}$ feature point. Each of the feature points may be set manually or automatically according to recognition processing. Alternatively, the feature points may be set automatically and later corrected manually upon necessity.

Based on the feature points set in each of the sample images, a mean face shape is calculated (Step #2). More specifically, mean values of coordinates of the feature points representing the same part are found among the sample images.

Principal component analysis is then carried out based on the coordinates of the mean face shape and the feature points representing the face shape in each of the sample images (Step #3). As a result, any face shape can be approximated by Equation (1) below:

$$S = S_0 + \sum_{i=1}^{n} p_i b_i \tag{1}$$

S and S0 are shape vectors represented respectively by simply listing the coordinates of the feature points (x1, y1, ..., x122, y122) in the face shape and in the mean face shape, while pi and bi are an eigenvector representing the $i^{th}$ principal component for the face shape obtained by the principal component analysis and a weight coefficient therefor, respectively. FIG. 6 shows how face shape changes with change in values of the weight coefficients b1 and b2 for the eigenvectors p1 and p2 as the highest and second-highest order principal components obtained by the principal component analysis. The change ranges from −3sd to +3sd where sd refers to standard deviation of each of the weight coefficients b1 and b2 in the case where the face shape in each of the sample images is represented by Equation (1). The face shape in the middle of 3 faces for each of the components represents the face shape in the case where the values of the weight coefficients are the mean values. In this example, a component contributing to face outline shape has been extracted as the first principal component through the principal component analysis. By changing the weight coefficient b1, the face shape changes from an elongated shape (corresponding to −3sd) to a round shape (corresponding to +3sd). Likewise, a component contributing to how much the mouth is open and to length of chin has been extracted as the second principal component. By changing the weight coefficient b2, the face changes from a state of open mouth and long chin (corresponding to −3sd) to a state of closed mouth and short chin (corresponding to +3sd). The smaller the value of i, the better the component explains the face shape. In other words, the $i^{th}$ component contributes more to the face shape as the value of i becomes smaller.

Each of the sample images is then subjected to conversion (warping) into the mean face shape obtained at Step #2 (Step #4). More specifically, shift values are found between each of the sample images and the mean face shape, for the respective feature points. In order to warp pixels in each of the sample images to the mean face shape, shift values to the mean face shape are calculated for the respective pixels in each of the sample images according to 2-dimensional 5-degree polynomials (2) to (5) using the shift values having been found:

$$x' = x + \Delta x \tag{2}$$

$$y' = y + \Delta y \tag{3}$$

$$\Delta x = \sum_{i=0}^{n} \sum_{j=0}^{n-i} a_{ij} \cdot x^i \cdot y^j \tag{4}$$

$$\Delta y = \sum_{i=0}^{n} \sum_{j=0}^{n-i} b_{ij} \cdot x^i \cdot y^j \tag{5}$$

Figure 7:
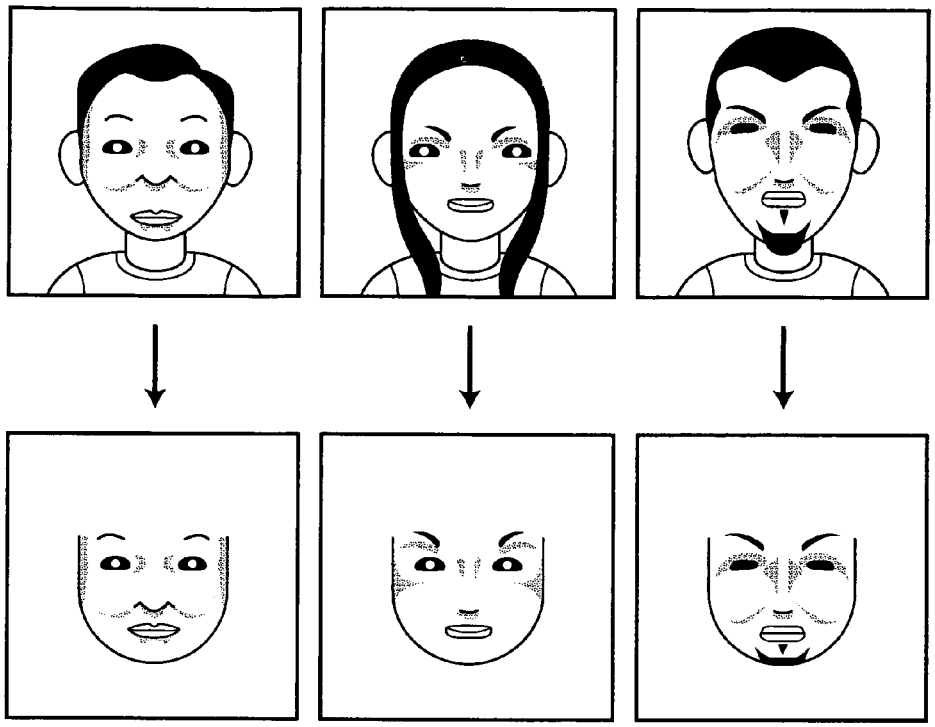
FIG. 7 shows luminance in mean face shapes converted from face shapes in sample images.

In Equations (2) to (5) above, x and y denote the coordinates of each of the feature points in each of the sample images while x' and y' are coordinates in the mean face shape to which x and y are warped. The shift values to the mean shape are represented by $\Delta x$ and $\Delta y$ with n being the number of dimensions while aij and bij are coefficients. The coefficients for polynomial approximation can be found by using a least square method. At this time, for a pixel to be moved to a position represented by non-integer values (that is, values including decimals), pixel values therefor are found through linear approximation using 4 surrounding points. More specifically, for 4 pixels surrounding coordinates of the non-integer values generated by warping, the pixel values for each of the 4 pixels are determined in proportion to a distance thereto from the coordinates generated by warping. FIG. 7 shows how the face shape of each of 3 sample images is changed to the mean face shape.

Thereafter, principal component analysis is carried out, using as variables the values of RGB colors of each of the pixels in each of the sample images after the change to the mean face shape (Step #5). As a result, the pixel values of RGB colors in the mean face shape converted from any arbitrary face image can be approximated by Equation (6) below:

$$A = A_0 + \sum_{i=1}^{m} q_i \lambda_i \tag{6}$$

In Equation (6), A denotes a vector (r1, g1, b1, r2, g2, b2, ..., rm, gm, bm) represented by listing the pixel values of RGB colors at each of the pixels in the mean face shape (where r, g, and b represent the pixel values of RGB colors while 1 to m refer to subscripts for identifying the respective pixels with m being the total number of pixels in the mean face shape). The vector components are not necessarily listed in this order in the example described above. For example, the order may be (r1, r2, ..., rm, g1, g2, ..., gm, b1, b2, ..., bm). A0 is a mean vector represented by listing mean values of the RGB values at each of the pixels in the mean face shape while qi and λi refer to an eigenvector representing the $i^{th}$ principal component for the RGB pixel values in the face obtained by the principal component analysis and a weight coefficient therefor, respectively. The smaller the value of i is, the better the component explains the RGB pixel values. In other words, the component contributes more to the RGB pixel values as the value of i becomes smaller.

Figure 8:
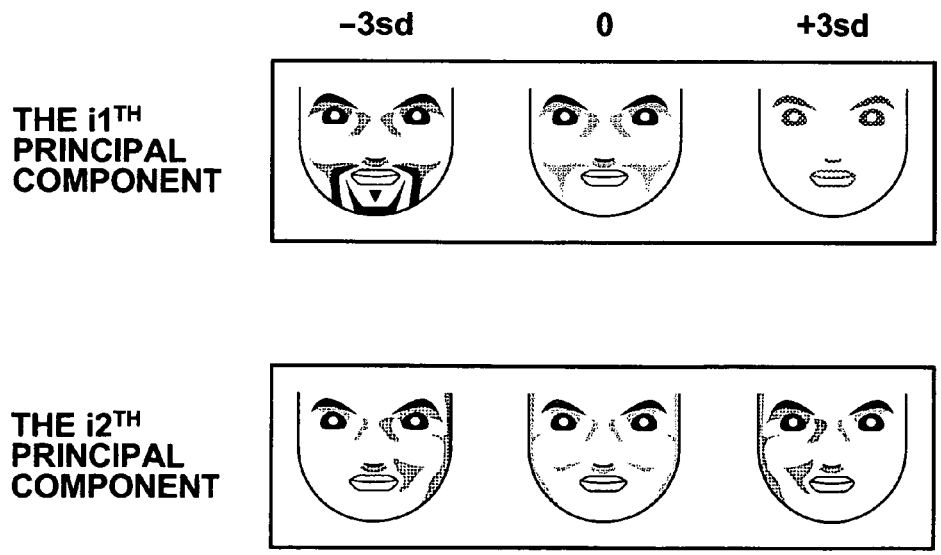
FIG. 8 shows how pixel values in a face change with change in values of weight coefficients for eigenvectors of principal components obtained by principal component analysis on the pixel values in the face.

FIG. 8 shows how faces change with change in values of the weight coefficients λi1 and λi2 for the eigenvectors qi1 and qi2 representing the $i1^{th}$ and $i2^{th}$ principal components obtained through the principal component analysis. The change in the weight coefficients ranges from −3sd to +3sd where sd refers to standard deviation of each of the values of the weight coefficients λi1 and λi2 in the case where the pixel values in each of the sample face images are represented by Equation (6) above. For each of the principal components, the face in the middle of the 3 images corresponds to the case where the weight coefficients λi1 and λi2 are the mean values. In the examples shown in FIG. 8, a component contributing to presence or absence of beard has been extracted as the $i1^{th}$ principal component through the principal component analysis. By changing the weight coefficient λi1, the face changes from the face with dense beard (corresponding to −3sd) to the face with no beard (corresponding to +3sd). Likewise, a component contributing to how a shadow appears on the face has been extracted as the $i2^{th}$ principal component through the principal component analysis. By changing the weight coefficient λi2, the face changes from the face with a shadow on the right side (corresponding to −3sd) to the face with a shadow on the left side (corresponding to +3sd). How each of the principal components contributes to what factor is determined through interpretation.

In this embodiment, the plurality of face images representing human faces have been used as the sample images. Therefore, in the case where a component contributing to difference in face outline shape has been extracted as the first principal component, the outline shape of the face candidate region F0 in the image P1 is changed from an elongated shape to a round shape with change in the value of the weight coefficient λ1 for the eigenvector q1 of the first principal component, for example. The component contributing to the difference in face outline shape is not necessarily extracted as the first principal component. In the case where the component contributing to the difference in face outline shape has been extracted as the K principal component (K≠1), "the first principal component" in the description below can be replaced by "the $K^{th}$ principal component". The difference in face outline shape is not necessarily represented by a single principal component. The difference may be due to a plurality of principal components.

Through the processing from Step #1 to #5 described above, the mathematical model M can be generated. In other words, the mathematical model M is represented by the eigenvectors pi representing the face shape and the eigenvectors qi representing the pixel values in the mean face shape, and the number of the eigenvectors is far smaller for pi and for qi than the number of pixels forming the face image. In other words, the mathematical model M has been compressed in terms of dimension. In the example described in Reference 1, 122 feature points are set for a face image of approximately 10,000 pixels, and a mathematical model of face image represented by 23 eigenvectors for face shape and 114 eigenvectors for face pixel values has been generated through the processing described above. By changing the weight coefficients for the respective eigenvectors, approximately 98% of variations in face shape and pixel values can be expressed.

Hereinafter, the exposure value determination processing based on the method of AAM using the mathematical model M will be described with reference to FIG. 3.

The face candidate detection unit 31 firstly reads the through image data Ps, and detects the face candidate region F0 in the image Ps. More specifically, the face candidate region F0 can be detected through various known methods such as a method using a correlation score between an eigenface representation and an image as has been described in Published Japanese Translation of a PCT Application No. 2004-527863 (hereinafter referred to as Reference 2). Alternatively, the face candidate region F0 can be detected by using a knowledge base, characteristics extraction, skin-color detection, template matching, graph matching, and a statistical method (such as a method using neural network, SVM, or HMM), for example. Furthermore, the face candidate region F0 may be specified manually with use of the operation unit 76 when the through image Ps is displayed on the display unit 78. Alternatively, a result of automatic detection of the face candidate region may be corrected manually.

Thereafter, the face detection unit 32 carries out processing for fitting the mathematical model M to the face candidate region F0. More specifically, an image is reconstructed according to Equations (1) and (6) described above while sequentially changing the values of the weight coefficients bi and λi for the eigenvectors pi and qi corresponding to the principal components in order of higher order in Equations (1) and (6). The values of the weight coefficients bi and λi causing a difference between the reconstructed image and the face candidate region F0 to become minimal are then found (see Reference 2 for details). Among the weight coefficients λi, the weighting parameter λ1 corresponding the face outline shape is a parameter. The face outline shape in the face candidate region F0 is set based on the weight coefficient λ1, and the region surrounded by the face outline shape is detected as the face region F1.

It is preferable for the values of the weight coefficients bi and λi to range only from −3sd to +3sd where sd refers to the standard deviation in each of distributions of bi and λi when the sample images used at the time of generation of the model are represented by Equations (1) and (6). In the case where the values do not fall within the range, it is preferable for the weight coefficients to take the mean values in the distributions. In this manner, erroneous application of the model can be avoided.

In the above description, only the first principal component represents the face outline shape. In the case where the face outline shape is represented by a plurality of principal components, the face outline shape is determined based on a combination of the values of the weight coefficients (such as λ1, λ2, . . . , λJ) for the principal components representing the face outline shape. In other words, the parameter (hereinafter referred to as C) may be found as a linear combination of the weight coefficients as shown by Equation (7) below wherein αi is a coefficient representing a rate of contribution of the $i^{th}$ principal component corresponding to the weight coefficient λi to the face outline shape:

$$C = \sum_{i=1}^{J} \alpha_i \lambda_i \tag{7}$$

The exposure value determination unit 33 determines the exposure value E0 for photography, based on the face region F1 detected by the face detection unit 32. More specifically, the exposure value determination unit 33 determines the exposure value E0 according to a result of measurement of luminance of the face region F1 through intensive photometry of the face region F1 or through photometry of only the face region F1.

As has been described above, in the exposure value determination processing in the embodiment of the present invention, the face region F1 in the through image Ps is detected by fitting the mathematical model M generated by the method of AAM using the sample images representing human faces to the face candidate region F0 in the through image Ps detected by the face candidate detection unit 31. The exposure value determination unit 33 then determines the exposure value E0 based on the face region F1. Therefore, even in the case where a shadow is cast on the face candidate region F0 or in the case where a color of a background region is similar to a skin color, the face region F1 can be detected accurately in the through image Ps. Consequently, the exposure value E0 can be determined, highly accurately reflecting the luminance of the face region F1 in the through image Ps with less effect of the background region excluding the face, and the image can be photographed in high color reproducibility.

Figure 9:
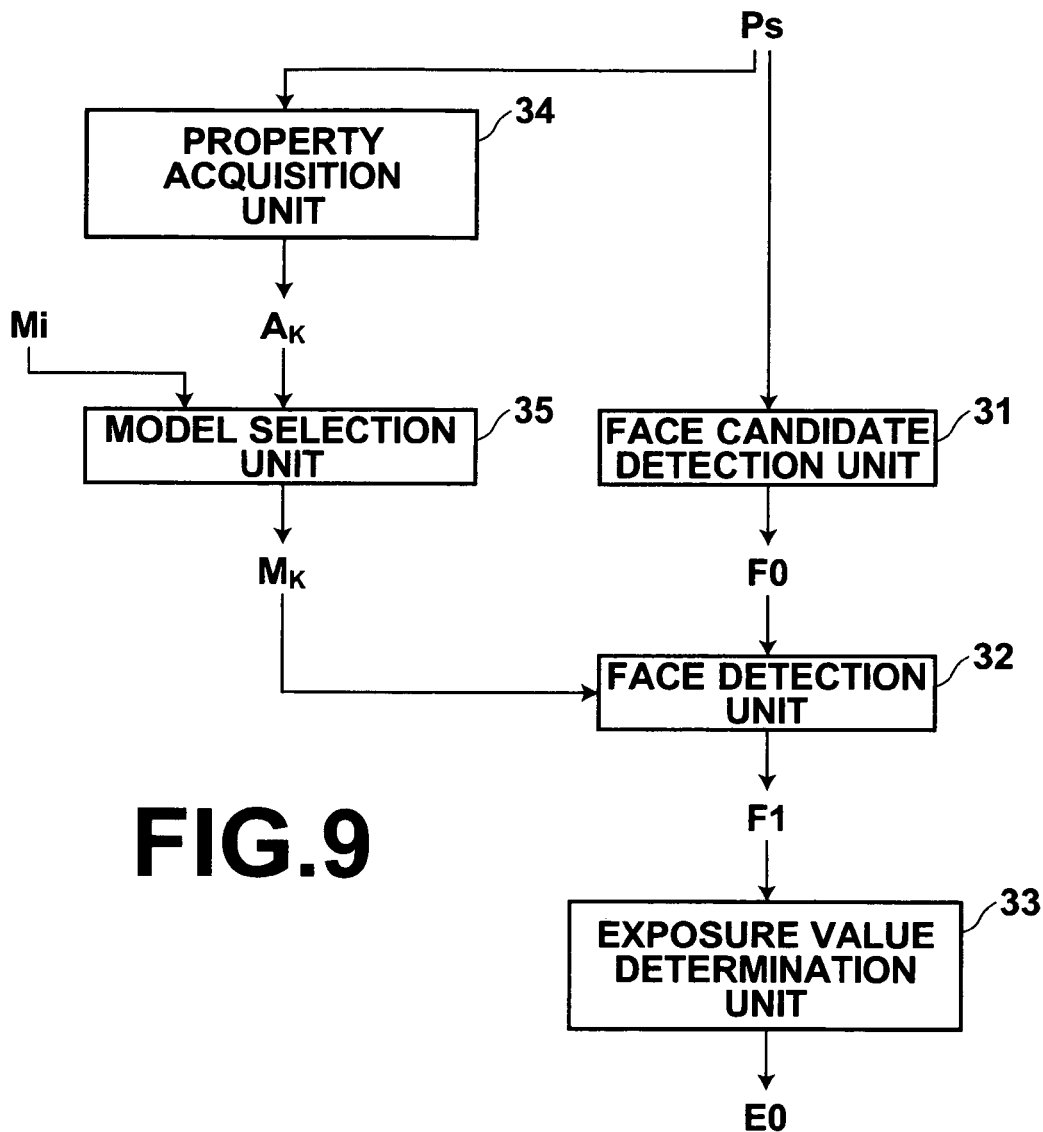
FIG. 9 is a block diagram showing an advanced aspect of the exposure value determination processing in the present invention.

In the embodiment described above, the mathematical model M is unique. However, a plurality of mathematical models Mi (i=1, 2, . . . ) may be generated for respective properties such as race, age, and gender, for example. FIG. 9 is a block diagram showing details of exposure value determination processing in this case. As shown in FIG. 9, a property acquisition unit 34 and a model selection unit 35 are added, which is different from the embodiment shown in FIG. 3. The property acquisition unit 34 obtains property information AK of the subject, based on the through image Ps. The model selection unit 35 selects a mathematical model MK generated only from sample images representing subjects having a property represented by the property information AK.

The mathematical models Mi have been generated based on the same method (see FIG. 4), only from sample images representing subjects of the same race, age, and gender, for example. The mathematical models Mi are stored by being related to property information Ai representing each of the properties that is common among the samples used for the model generation.

The property acquisition unit 34 may obtain the property information AK by judging the property of the subject through execution of known recognition processing (such as processing described in Japanese Unexamined Patent Publication No. 11(1999)-175724) on the through image Ps. Alternatively, the property information AK may be obtained through input thereof from the operation unit 76 at the time of photography. In the case where GPS information representing a photography location is available, the country or region corresponding to the GPS information can be identified. Therefore, the race of the subject can be inferred to some degree. By paying attention to this fact, a reference table relating GPS information to information on race may be generated in advance. By installing a GPS function to the digital camera and by obtaining the GPS information at the time of photography, the information on race related to the GPS information may be inferred as the race of the subject when the reference table is referred to according to the GPS information.

The model selection unit 35 obtains the mathematical model MK related to the property information AK obtained by the property acquisition unit 34, and the face detection unit 32 fits the mathematical model MK to the face candidate region F0.

As has been described above, in the case where the mathematical models Mi corresponding to the properties have been prepared, if the model selection unit 35 selects the mathematical model MK related to the property information AK obtained by the property acquisition unit 34 and if the face detection unit 32 fits the selected mathematical model MK to the face candidate region F0, the mathematical model MK does not have eigenvectors contributing to variations in face shape and luminance caused by difference in the property information AK. Therefore, the face region F1 can be detected based on only eigenvectors representing factors determining the face outline shape other than the factor representing the property. Consequently, the exposure value E0 can be determined reflecting luminance in the face region F1 in the through image Ps with higher accuracy, and the image can be photographed in higher color reproducibility.

From a viewpoint of improvement in processing accuracy, it is preferable for the mathematical models for respective properties to be specified further so that a mathematical model for each individual as a subject can be generated. In this case, the through image Ps needs to be related to information identifying each individual.

A person as a subject of photography is often fixed to some degree for each digital camera. Therefore, if a mathematical model is generated for the face of each individual as a frequent subject of photography with the digital camera, a model without variation of individual difference in face can be generated. Consequently, the exposure value determination processing can be carried out with extremely high accuracy for the face of the person.

In the embodiment described above, the mathematical models are stored in the internal memory 79 in advance. However, from a viewpoint of processing accuracy improvement, it is preferable for mathematical models for different human races to be prepared so that which of the mathematical models is to be stored can be changed according to a country or region to which the digital camera is going to be shipped.

In the embodiment described above, the individual face image is represented by the face shape, the pixel values of RGB colors, and the weight coefficients bi and λi therefor. However, the face shape is correlated to variation in the pixel values of RGB colors. Therefore, a new appearance parameter c can be obtained for controlling both the face shape and the pixel values of RGB colors as shown by Equations (8) and (9) below, through further execution of principal component analysis on a vector (b1, b2, . . . , bi, . . . , λ1, λ2, . . . , λi, . . . ) combining the weight coefficients bi and λi:

$$S = S_0 + Q_S c \tag{8}$$

$$A = A_0 + Q_A c \tag{9}$$

A difference from the mean face shape can be represented by the appearance parameter c and a vector QS, and a difference from the mean pixel values can be represented by the appearance parameter c and a vector QA.

In the case where this model is used, the face detection unit 32 finds the face pixel values in the mean face shape based on Equation (9) above while changing a value of the appearance parameter c. Thereafter, the face image is reconstructed by conversion from the mean face shape according to Equation (8) above, and the value of the appearance parameter c causing a difference between the reconstructed face image and the face region F1 to be minimal is found.

What is claimed is:

1. A photography apparatus comprising:
    face detection means for detecting a face region in an input through image by fitting a model representing a human face to a face candidate region in the input through image, the model obtained by carrying out predetermined statistical processing on a plurality of images representing human faces, and the model representing the human face by one or more statistical characteristic quantities including a statistical characteristic quantity representing at least a face outline shape;

exposure value determination means for determining an exposure value for photography of a still image, based on the face region having been detected; and photography means for carrying out the photography of the still image according to the exposure value having been determined.

2. The photography apparatus according to claim 1 further comprising face candidate detection means for detecting the face candidate region in the input through image.

3. The photography apparatus according to claim 2 further comprising selection means for obtaining properties of the face candidate region in the input through image and for selecting models corresponding to the obtained property from a plurality of the models representing the face for respective properties of the face, wherein the face detection means detects the face region by fitting the selected model to the face candidate region.

4. The photography apparatus according to claim 1 further comprising:

selection means for obtaining properties of the face candidate region in the input through image and for selecting models corresponding to the obtained property from a plurality of the models representing the face for respective properties of the face, wherein the face detection means detects the face region by fitting the selected model to the face candidate region.

5. The photography apparatus according to claim 1, wherein the model is obtained by:

setting feature points which represent a face outline shape and facial features in sample images of human faces;

calculating a mean face shape based on the set feature points;

performing a statistical analysis based on the calculated mean face shape and the set feature points;

warping the sample images into the mean face shape; and obtaining the statistical quantities representing the face outline shape by performing a principle component analysis and applying weight coefficients on the warped sample images.

6. The photography apparatus according to claim 1, wherein the exposure value determination means determines the exposure value for photography of the still image based on measurement of luminance of the detected face region via an intensive photometry.

7. The photography apparatus according to claim 1, further comprising:

face candidate detection means for detecting a candidate face in the input through image, wherein the face detecting means reconstructs an image of the candidate face in steps, compares the reconstructed image to the face candidate at each step to determine parameters and sets the face outline based on at least one determined parameter.

8. The photography apparatus according to claim 7, wherein the face detecting means fits the set face outline to the statistical quantities of the model based on the determined parameters.

9. The photography apparatus according to claim 1, wherein a plurality of models of the human faces, related to property information of human faces, is obtained and stored in advance and further comprising:

property obtaining means for obtaining a property of the face candidate region in the input through image; and selecting means for selecting a corresponding property related model based on the obtained property of the face candidate region, wherein the face detecting means detects the face region by fining the selected property related model to the face candidate region.

10. The photography apparatus according to claim 1, wherein the face outline shape of the model is represented by a face contour and a facial feature contour.

11. A photography method comprising the steps of:

detecting a face region in an input through image by fitting a model representing a human face to a face candidate region in the input through image, the model obtained by carrying out predetermined statistical processing on a plurality of images representing human faces, and the model representing the human face by one or more statistical characteristic quantities including a statistical characteristic quantity representing at least a face outline shape;

determining an exposure value for photography of a still image, based on the face region having been detected; and carrying out the photography of the still image according to the exposure value having been determined.

12. A computer readable medium having a photography program recorded thereon, which program, when executed by a computer, causes the computer to function as:

face detection means for detecting a face region in an input through image by fitting a model representing a human face to a face candidate region in the input through image, the model obtained by carrying out predetermined statistical processing on a plurality of images representing human faces, and the model representing the human face by one or more statistical characteristic quantities including a statistical characteristic quantity representing at least a face outline shape;

exposure value determination means for determining an exposure value for photography of a still image, based on the face region having been detected; and photography means for carrying out the photography of the still image according to the exposure value having been determined.

* * * * *